United States Patent
Abraham, Jr.

(10) Patent No.: US 10,769,023 B1
(45) Date of Patent: Sep. 8, 2020

(54) BACKUP OF STRUCTURED QUERY LANGUAGE SERVER TO OBJECT-BASED DATA STORAGE SERVICE

(71) Applicant: Amazon Technologies, Inc., Seattle, WA (US)

(72) Inventor: Steven John Abraham, Jr., Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 14/574,140

(22) Filed: Dec. 17, 2014

(51) Int. Cl.
*G06F 11/14* (2006.01)
*G06F 16/11* (2019.01)

(52) U.S. Cl.
CPC ...... *G06F 11/1451* (2013.01); *G06F 11/1464* (2013.01); *G06F 16/119* (2019.01)

(58) Field of Classification Search
CPC ........... G06F 11/1464; G06F 17/30067; G06F 3/067; G06F 11/1451; G06F 11/1453; G06F 16/119
See application file for complete search history.

(56) References Cited

U.S. PATENT DOCUMENTS

| | | | | |
|---|---|---|---|---|
| 5,649,196 A * | 7/1997 | Woodhill | ............ | G06F 11/1451 707/999.009 |
| 5,758,359 A * | 5/1998 | Saxon | ................. | G06F 11/1461 707/644 |
| 7,146,387 B1 * | 12/2006 | Russo | ................. | G06F 11/1469 |
| 7,676,510 B1 * | 3/2010 | Karinta | ............... | G06F 11/1448 707/654 |
| 7,890,714 B1 * | 2/2011 | Tsaur | ................... | G06F 11/1458 711/162 |
| 8,060,476 B1 * | 11/2011 | Afonso | ............... | G06F 11/1451 707/649 |
| 8,121,982 B1 * | 2/2012 | Panchbudhe | ......... | H04W 28/14 707/652 |
| 8,260,750 B1 * | 9/2012 | Gugick | ............... | G06F 11/1461 707/645 |
| 8,375,124 B1 * | 2/2013 | Schwartz | ................ | H04L 67/06 370/473 |
| 9,934,099 B1 * | 4/2018 | Sharma | ............... | G06F 11/1458 |
| 2003/0126247 A1 * | 7/2003 | Strasser | .............. | G06F 11/1458 709/223 |
| 2007/0185938 A1 * | 8/2007 | Prahlad | ............... | G06F 16/2365 |
| 2009/0150697 A1 * | 6/2009 | Yang | ..................... | G06F 1/3203 713/323 |
| 2013/0100819 A1 * | 4/2013 | Anchan | ................. | H04W 48/20 370/241 |
| 2013/0212165 A1 * | 8/2013 | Vermeulen | ........ | G06F 17/30212 709/203 |

(Continued)

*Primary Examiner* — Cam Y T Truong
(74) *Attorney, Agent, or Firm* — Davis Wright Tremaine LLP

(57) ABSTRACT

A structured query language server may receive a command from a backup control server to provision a virtual device and perform a backup operation on the structured query language server. The structured query language server may be configured to write data to the virtual device in order to be transmitted to a data storage service. The backup and restore operations directed to the structured query language server may include a web service application programming interface request to the data storage service to cause the data written to the virtual device to be stored as a data object in the data storage service.

20 Claims, 7 Drawing Sheets

(56) References Cited

U.S. PATENT DOCUMENTS

| | | | |
|---|---|---|---|
| 2013/0339643 A1* | 12/2013 | Tekade | G06F 17/30581 711/162 |
| 2014/0317364 A1* | 10/2014 | Shepherd | G06F 3/065 711/162 |
| 2015/0012698 A1* | 1/2015 | Bolla | G06F 12/0866 711/113 |
| 2015/0095597 A1* | 4/2015 | Ayanam | G06F 3/065 711/162 |
| 2015/0378830 A1* | 12/2015 | Hoobler, III | G06F 11/1446 707/648 |

* cited by examiner

BACKUP OF STRUCTURED QUERY LANGUAGE SERVER TO OBJECT-BASED DATA STORAGE SERVICE

BACKGROUND

Database systems have popular applications in many fields including the Internet and electronic commerce spaces. In many applications, database systems are used to maintain important information about products, customers and the like. Further, with the growth of Internet and e-commerce applications, among others, it is becoming increasingly necessary for database systems to be able to handle ever-growing data sets. It is also becoming increasingly important for database systems to be capable of providing features such as the ability to perform expedient data queries and the ability to provide a large data throughput.

Normally, when a user causes a Structured Query Language (SQL) server backup, the backup must be written to tape or disk. The backup file(s) created may be copied to a data object, such as a binary large object (BLOB) or basic large object, storage service, such as an object-based data storage service from that tape or disk. Additionally, when a user wishes to restore a database from a backup stored in data object storage, the backup file(s) must first be copied to a local disk before that restore operation can begin. There is currently a significant barrier to entry with regard to moving an on premise SQL server database to a database service, such as an online database service. There are multiple steps involved in initiating a migration process, each step prone to human error that a user must go through in order to move their database to a database service.

BRIEF DESCRIPTION OF THE DRAWINGS

Various embodiments in accordance with the present disclosure will be described with reference to the drawings, in which.

DETAILED DESCRIPTION

Figure 1:
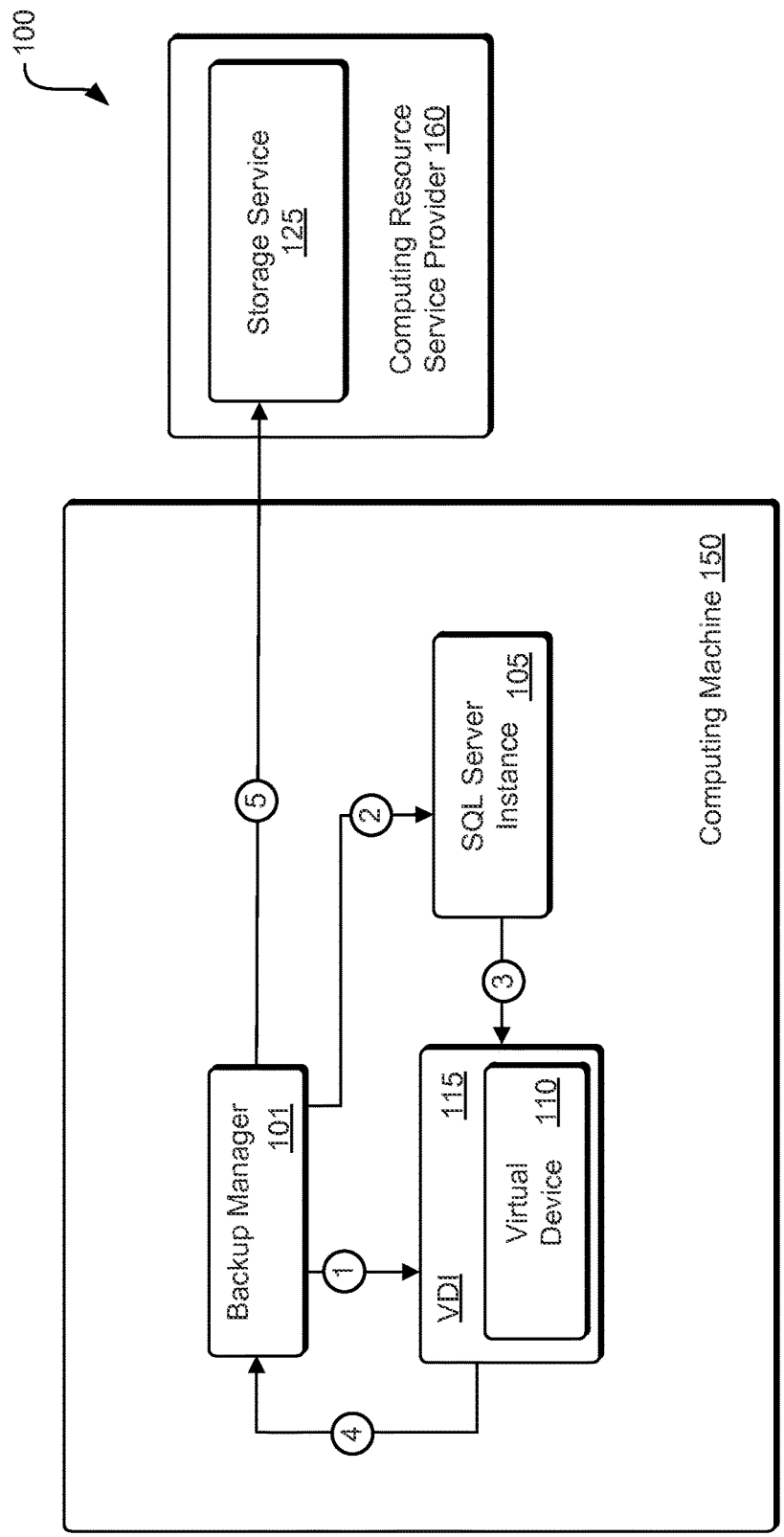
FIG. 1 is an illustrative example of an environment in which various embodiments can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the managing and storing of data objects in an object-based data storage service. In an embodiment, a user associated with a customer of a computing resource service provider, via the user's local computing device, issues a backup command to create a Structured Query Language (SQL) server database backup in order to store a database managed by the SQL server in an object-based data storage service. The user may cause the command to be issued using a backup manager operably interconnected to or stored on a computing device, the backup manager is configured to transmit a request to a virtual device interface to create a virtual device. The virtual device, in an embodiment, is a memory construct that is an address in a memory operably interconnected to the SQL server.

After the virtual device has been instantiated, the backup manager may issue a command, to the SQL server, to perform a backup operation. The SQL server is configured to perform the backup operation by transmitting, e.g., streaming, raw backup data to the virtual device. The backup manager is further configured to retrieve the data written to the virtual device to be transmitted to the object-based data storage service, where the raw backup data may be stored as a data object. For example, the data written to the virtual device may be a contiguous sequence of bits, representing the data from the database and/or the structure of the database managed by the SQL server, transmitted continuously from the virtual device to the backup manager.

In some example embodiments, the object-based data storage service may be an on-demand data storage service or collection of computing resources configured to synchronously process requests to store and/or access data transmitted from the virtual device. The object-based data storage service may be configured to receive multipart upload requests via an API, such as an API operably interconnected with the backup manager or incorporated into the backup manager, when the database managed by the SQL server contains large objects to be stored at the data storage service. Generally, a database managed by an SQL server may be large enough, e.g., multiple terabytes, to make multipart uploads advantageous. The backup manager may be configured to transmit API requests in sequence according to each part of the multipart upload, updating a sequence enumerating, in the request, the parts being uploaded at each next API request. The virtual device may operate as a buffer to retrieve a specified amount of data, e.g., at least 5 MB of data in some embodiments, and issue a "PUT" object operation to add the data to the object-based data storage system. The data storage service is configured to construct the complete data object from the transferred parts.

In an embodiment, a user may cause a command to perform a restore operation to restore the SQL server database backup files previously stored in an object-based data storage service. The restore operation may be performed in an opposite operation from the backup operation. A user may cause a virtual device interface API request to be transmitted to a virtual device interface (VDI) in order for the VDI to create the virtual device. The user may further cause a restore operation via a restore manager issuing a restore command to an SQL server providing the location of the data on the data storage service to be restored. The restore manager may retrieve the backup data from the storage service and stream the backup data to the virtual device. The SQL server provided with restore operation instructions is then configured to retrieve, e.g., read, the backup data from the virtual device and store the data in a SQL server database.

In addition, the techniques described and suggested herein facilitate additional technical advantages. For example, in some embodiments, the SQL server may be configured to back up the data directly to one or more other databases or SQL servers that are configured to perform a restore operation instead of a backup operation. Further, as a customer may only require redundant storage of the SQL server database for compliance purposes, the customer may decide to cause the data to be written to an archival data storage service that processes requests asynchronously.

FIG. 1 is an example embodiment of a computing environment 100 for implementing aspects in accordance with various embodiments. As will be appreciated, although a computing environment 100 is used for purposes of explanation, different environments may be used, as appropriate, to implement various embodiments. In various embodiments, the computing system 100 includes a computing machine 150, which is operably interconnected to and/or includes a backup manager 101, a Structure Query Language (SQL) server instance 105, a virtual device interface (VDI) application programming interface (API) 115, and a virtual device 110.

In various embodiments, a backup manager 101 may initiate storage transfer operations between the SQL server instance 105 and the storage service 125, such as an object-based data storage service running on a computing resource service provider 160. The backup manager 101 may be a controller, such as a hardware device or software program configured to manage and/or direct data flow between two or more computing devices/components. For example, a customer may cause an SQL server database backup to be initiated via the backup manager 101 to create backup files to be directly transferred to the object-based data storage service, such as storage service 125, without having to be temporarily or intermediately copied or stored to a local disk prior to being stored with the storage service.

For example, the customer, or a process configured to execute database backup and/or restore commands, may direct the backup manager 101 to issue storage operation commands to the SQL server instance 105. Such data storage commands may be configured to cause the SQL server instance 105 to perform one or more operations specified by the storage operation commands. As illustrated in FIG. 1, for example, the backup manager 101 may be configured to transmit a CREATE command at step 1 to the virtual device interface (VDI) 115, which may instruct the VDI to construct a virtual device 110 for use in storage management. The backup manager 101 may further be configured to transmit a BACKUP command, such as issuing a native SQL server backup command at step 2, to the SQL server 105, which may instruct the SQL server to begin a backup operation of the SQL server database to the storage server 125. The backup manager may further be configured to transmit a DATABASE command to the SQL server, which may instruct the SQL server to begin a backup operation of the complete database or provide a command with a list of files or file groups to begin a backup of only those files or file groups. The data storage commands may be configured in accordance with a data storage command protocol, which may be a structured query language (SQL) command, a binary input/output (I/O) protocol, a block-level storage operation command or otherwise. Other examples include the small computer system interface (SCSI) and serial ATA. The data storage commands may be transmitted over another protocol, such as by encoding the command in a data packet transmitted over a network. While examples of specific protocols are provided for the purpose of illustration, the techniques described herein are extendible to other protocols including, but not limited to, proprietary protocols.

Once the backup manager 101 transmits the virtual device command to the VDI, the virtual device 110 is created in a local memory of the computing machine for use in storage management and may be accessible to any and all components of the computing machine 150. The local memory may be a computer-accessible medium configured to store program instructions and data for implementing a virtual device according to embodiments presented herein. The virtual device 110 may be implemented on common, local block-based storage, which may be implemented in volatile memory, non-volatile memory, or in a combination thereof. The virtual device may be created/generated each time an SQL server database migration operation, such as a backup/restore operation, is performed and may be deleted each time the SQL backup/restore operation is completed. In alternative example embodiments, the virtual device may be created and maintained for future backup operations; in such example embodiments, the SQL server may issue a DELETE command, in order to delete the contents of the virtual device in order to provide an empty device for a next backup.

The backup manager 101 may further be configured to transmit a backup storage command to the SQL server instance 105, which may instruct the SQL server to begin a backup operation of the SQL server database to the storage server 125. The SQL server instance 105, after receiving a backup command, is configured to stream backup data from the SQL server instance to the virtual device 110 at step 3. The backup manager 101, or an API of the backup manager, may read the backup data from the virtual device at step 4 and stream the backup data to the storage service 125, at step 5.

The computing resource service provider 160 may be operably interconnected to computing hardware resources, such as via a wired or wireless communication link, used to operate one or more services. Such services may include services that enable customers of the computing resource service provider to provide data storage, such as a storage service 125, to support the customers' operations. The customer may be an individual, organization or automated process that could utilize one or more services provided by the computing resource service provider 160 to provision and manage one or more resources to support operations. In some embodiments, the computing resource service provider may provide for additional services, which may, for example, include hardware servers, network devices and other equipment, such as server racks, networking cables, and the like for hosting data storage services for customers.

The storage service 125, such as an object-based data storage service provided by a computing resource service provider 160, may comprise a collection of computing resources, such as data storage servers, Web servers, application servers, that collectively operate to store data for a customer. The data stored in the data storage service 125 may be organized into data objects. The data objects may have arbitrary sizes except, perhaps, for certain constraints on size. Thus, the object-based data storage service 125 may store numerous data objects of varying sizes. The object-based data storage service may operate as a key value store that associates data objects with identifiers of the data objects, which may be used by the customer to retrieve or perform other operations in connection with the data objects stored by the object-based data storage service 125. Access to the object-based data storage service 125 may be through appropriately configured API calls.

Figure 2:
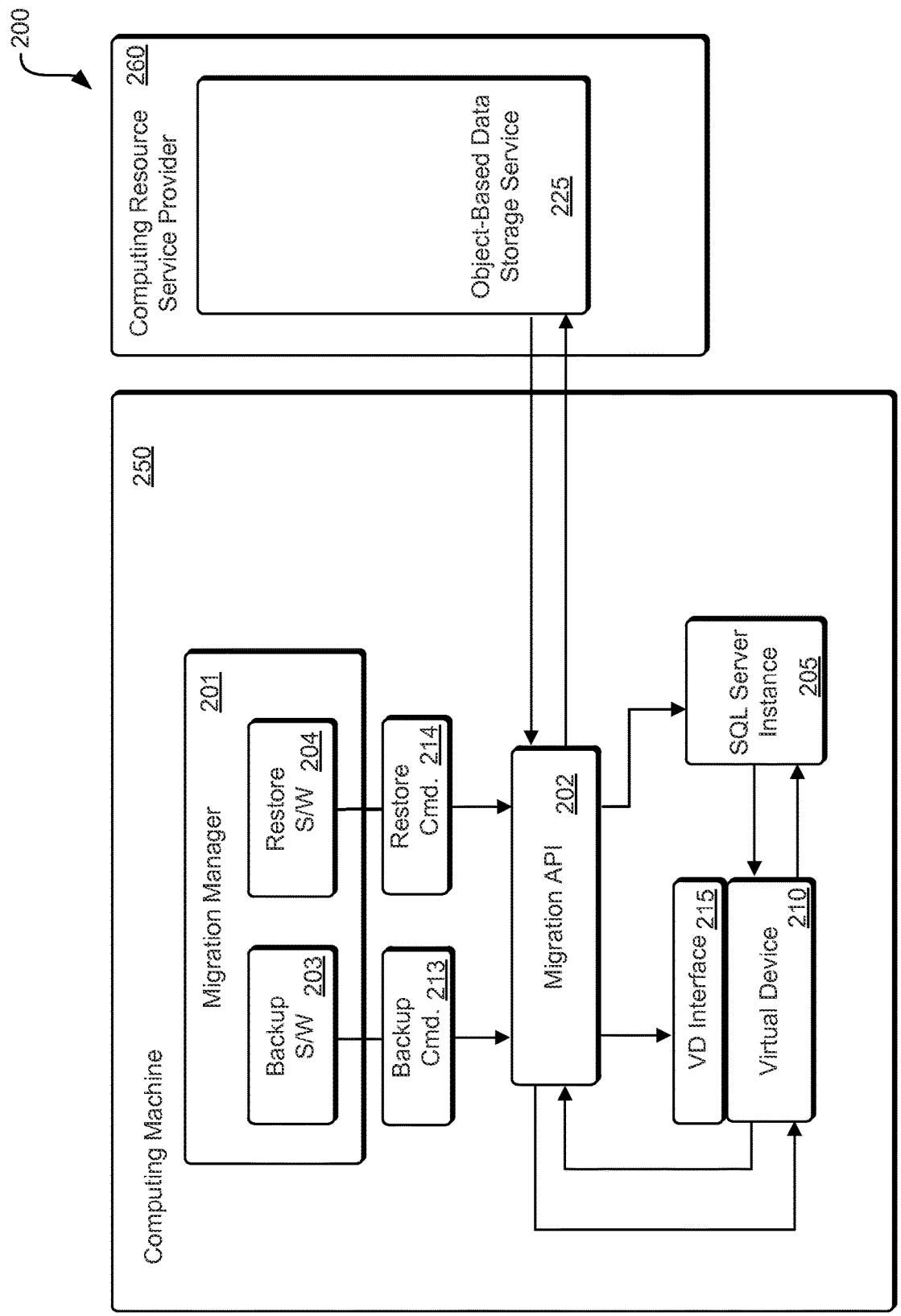
FIG. 2 is an illustrative example of an environment in which various embodiments can be practiced.

FIG. 2 is an example embodiment of an environment 200 for performing a backup operation and/or restore operation of a database server 205 stored on a computing machine 250 in accordance with various embodiments. The computing machine 250 may be configured with a migration manager 201 for maintaining code, such as backup software process 203 and/or restore software process 204, to create components necessary for and provide instructions for performing a Structured Query Language (SQL) server backup and restore operations to-and-from a customer's local machine 250 and an object-based data storage service 225 provided by a computing resource service provider 260.

The computing resource service provider 260 includes the object-based data storage service 225, which may comprise a collection of computing resources that collectively operate to provide storage for data archiving and backup of customer data. The data may comprise one or more data files that may be combined to form a data store or archive. A customer may interact with the object-based data storage service 225 (for example, through appropriately configured API 215 calls made to the object-based data storage service) to generate one or more data stores, upload and retrieve the one or more data stores or monitor the generation, upload or retrieval of the one or more data stores.

The object-based data storage service 225 may be a collection of computing resources configured to synchronously process requests to store and/or access data. The object-based data storage service 225 may operate using computing resources (e.g., databases) that enable the object-based data storage service 225 to locate and retrieve data quickly, to allow data to be provided in responses to requests for the data. For example, the object-based data storage service 225 may maintain stored data in a manner that, when a request for a data object is retrieved, the data object can be provided (or streaming of the data object can be initiated) in a response to the request.

A customer may desire an SQL server database backup from one or more of the customer's local computing machines 250, which may be located on a customer's local premises network or data center, for example, to the object-based data storage service 225 provided by a computing resource service provider for which the customer subscribes. The customer, or a scheduler of the computing device, may cause an SQL server database backup by transmitting a command via a migration application programming interface (API) 202 to a virtual device interface (VDI) 215 to instantiate a virtual device 210 for the requested backup, and transmit a backup command 213 to the SQL server instance 205 to begin the backup operation. The SQL server instance 205 may include storage space allocated to a database, such as a relational database or online database, configured to store and retrieve data from other software applications, on the same computer or a computer operably interconnected via a network (e.g., the Internet). The SQL server instance 205 maintaining certain data may receive commands from the migration manager 201 via the migration API 202 in order to begin a backup or restore operation. The migration API 202 may be incorporated as a mechanism of the migration manager 201, or an operably interconnected interface.

The migration API 202 may transmit to the virtual device interface 215 a command to create or instantiate a new virtual device 210. The VDI may create the virtual device 210 as a memory construct in an address of memory operably interconnected with the SQL server, backup manager, and other computing components and servers accessible to the computing machine 250. The virtual device may be configured as a buffer component to be shared by hardware of the computing devices or program processes that operate at different speeds or with different sets of priorities during the SQL server database backup.

The virtual device interface 215 is configured to define virtual devices for SQL servers to backup and restore databases and transaction logs. Having access to these virtual devices provides a customer with access to the raw data that is passed into and out of SQL server database during a backup or restore operations. One VDI may support multiple virtual devices; for example, the VDI API 215 may support up to 64 virtual devices, which enables a customer to modify this component to support up to 64 separate streams, for example, when writing the output to multiple storage services, or if multiple processors may be used to process data in multiple streams (and therefore multiple threads). Raw data, for example, may be data collected directly from a source, such as the SQL server database or the object-based data storage server, unprocessed data, unformatted data, and the like. The VDI is further configured to generate a unique name for the virtual device. For example, a globally unique identifier (GUID) may be generated as a unique reference number used as an identifier for the virtual device; however, other forms of unique identifiers may be generated, such as a universally unique identifier or the like.

A customer may use the migration manager, VDI API 215, or other system process to create one or more virtual devices. Once the virtual device is created, the migration API 202 specifies the device to which the backup may occur, i.e., the created virtual device for that specific backup command must be specified. In the case of a backup operation, virtual device 210 may be the stream to which the raw bytes from an SQL server database are written according to a write process.

Further, the VDI may include, for example, an interface to enable a customer to perform any number of tasks on this data. For example, common tasks include compressing and/or encrypting the data before it is read from the SQL server database. In an embodiment, access to the virtual device 210, via an appropriate API call to the VDI API 215, provides the customer with the ability to compress SQL server database backups in memory prior to being written to an object-based data storage system. By simply passing a compressed file stream as the input allows for reduced input/output (I/O) as less data is written to the storage service, reduced space requirements as the backup is compressed, backup speed improvements, and restore speed improvements, as there may be less I/O. A customer may further use cryptography objects to encrypt an SQL server database backup prior to being transferred and stored on the object-based data storage service to ensure that unencrypted bytes of the database backup are not stored remotely.

Once the virtual device has been configured, and a backup or restore command has been issued to the SQL server, the backup or restore operation is performed via the virtual device, wherein the SQL server instance 205 streams backup data to the virtual device 210. The migration manager may transmit API requests and receive messages from VDI API in order to analyze the data transfer to ensure that all data is being transferred from the SQL server database to the virtual device. The backup manager is further configured to receive feedback from the VDI API 215 as to when the virtual device is prepared to accept another command, e.g., the backup or restore command issued to the SQL server instance or a command to instruct that the SQL server instance is finished processing the initial command. The VDI is also configured to receive commands to complete the transfer process, e.g., finishing and terminating the virtual device.

In an embodiment, the SQL server 205 may be large in size, e.g., 5 Terabytes, and require multipart upload to be written to the object-based data storage service 225. Generally, multipart upload requires a large object to be subdivided into approximately equal parts, where each part to be transferred must be at least a certain size, such as 5 Megabytes (MB), 7 MB, 10 MB in size before it is stored. As such, when data is read from the virtual device, the data blocks may be 65 Kilobytes (kB) in size, which requires that the virtual device receive multiple data blocks to reach the minimum required size to transfer the part to the storage service. The virtual device may operate as a buffer in order to retrieve a specified or required amount of data, e.g., at least 7 MB of data. The buffer allows each device or process to operate without being held up by the other. The virtual device and/or the migration API 202 may be midpoint-holding places to support the coordination of data flow/transfer between the virtual device 210 and the object-based data storage service or other storage service.

The virtual device may transfer the data, or part of data, via a read process to the migration API 202, which may be configured as a buffer during the SQL server database backup operations. The migration API may receive data from the virtual device and hold the data, when necessary, specified, or instructed, for example, receiving instructions to transmit a data block of less than 7 MB when the data block is determined to be the last data block of the SQL server database. The data may be transmitted from the migration API 202 to the object-based data storage service 225 according to a "PUT" object API request transmitted from the migration manager to the migration API.

In addition to SQL server database backup operations, alternative example embodiments may include restoring data from a storage service to an SQL server. For example, the migration manager 201 may include restore software application 204, which may be used in restore processes. The migration API 202 may transmit a CREATE command to the VDI to create a virtual device, and may transmit a restore command 214 to the SQL server instance 205 to initiate a restore operation. The restore command may include a file or file group and the location in the object-based data storage service from which to restore data. In a restore operation, the migration API 202 may read backup data from the object-based data storage service via a "GET" object command, and the migration API further streams the backup data to the virtual device. The restore operation further includes the SQL server instance retrieving the backup data from the virtual device 210 and store the retrieved data in an SQL server database.

Figure 3:
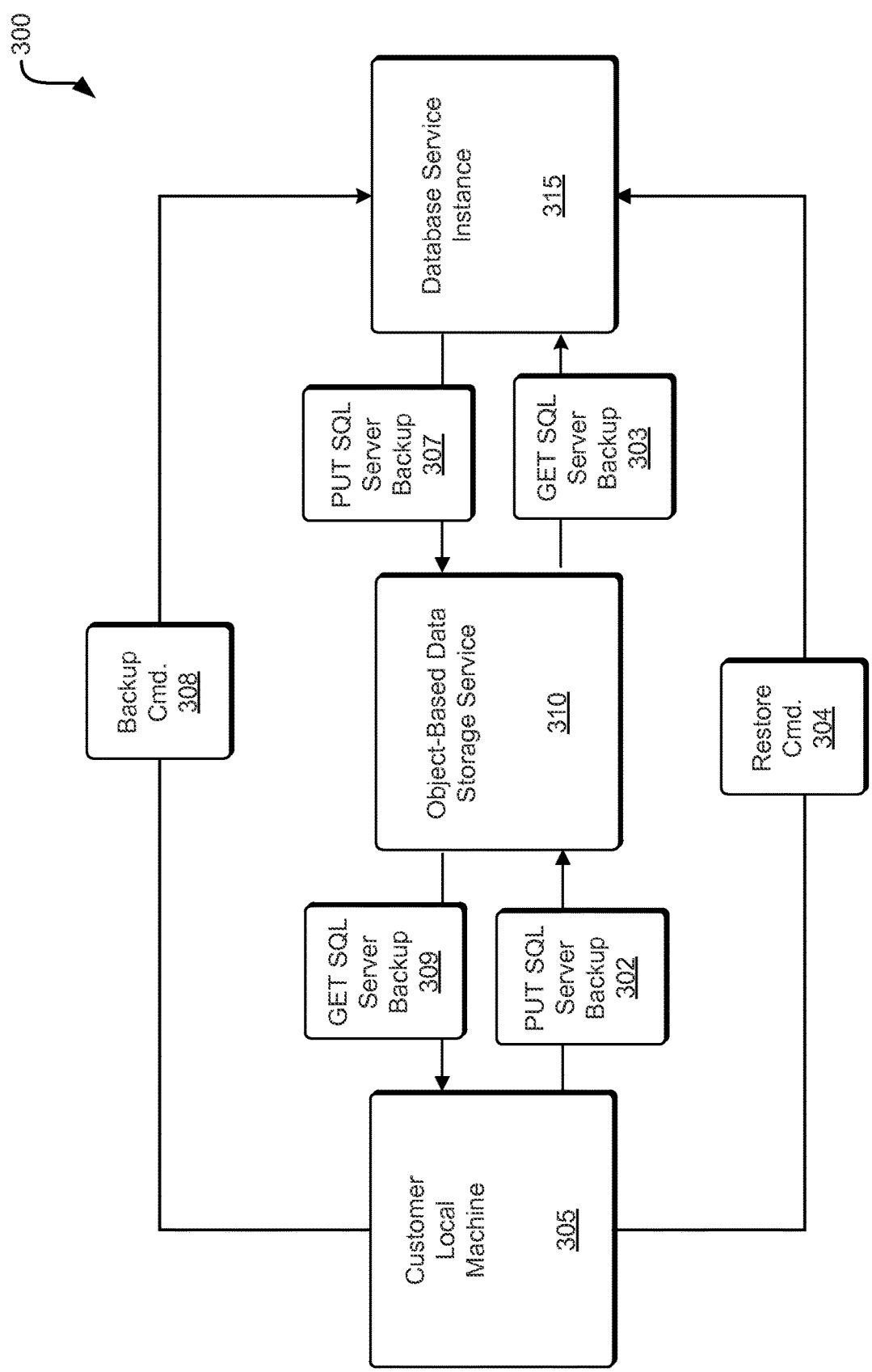
FIG. 3 is a block diagram illustrating various aspects of the present disclosure.

FIG. 3 shows an example of a block diagram for managing a data set in a database service in accordance with at least one embodiment. The block diagram 300 illustrates a customer's local machine 305, an object-based data storage service 310, and a database service instance 315.

The database service instance 315 may be a second database located on another local machine in the same or different customer premises network, a relational database, service, an online database service, or the like. For example, a customer may have the customer local machine 305 in a first zone and the database service instance in a second zone. Data zones may include physical and logical groupings of computing resources where the groupings can be defined in various ways, such as by geographic location. The groupings may further include geographic locations, where each location has multiple data centers and each data center corresponds to a different data zone. A customer may have such infrastructures for many purposes, for example, for fault tolerance or redundancy.

In such a network, a customer may require databases, such as Structured Query Language (SQL) servers located at a first location, such as the customer local machine 305, to be copied to the second location. For this, a customer may use both an SQL server database backup operation and an SQL server database restore operation. In data management, the restore operation may be a process that involves copying backup files from secondary storage (e.g., object-based data storage service 310) to a different location. It is noted that secondary storage may be other data mediums, such as a tape, zip disk, or other backup media. A restore is performed in order to return data to its original condition if files have become damaged or to copy or move data to a new location.

In the example embodiment of FIG. 3, the customer local machine 305 and the database service instance 315 would generally each maintain the same or similar computing components as described and illustrated in FIGS. 1 and 2 above. The customer local machine would transmit a "PUT" object request 302 of the SQL server database backup, as described above, and would upload a backup of the SQL server database from the machine 305 to the object-based data storage service 310. The customer local machine would initiate a restore operation by transmitting a restore command 304 from the customer machine 305 to the database service instance 315 and the database service instance 315 would issue a "GET" object request 303 of the SQL server database backup stored on the object-based data storage service 310. For example, a customer may require certain data from a first database be maintained indefinitely, or a long period of years, but not require access to that data. As such, the customer could perform a backup of the SQL server database on the customer machine 305 to an object-based data storage service and delete the SQL server database from the customer local machine. The customer may cause the transfer of the backup database to a different, less expensive machine, such as database service instance 315, by performing the restore operation. At that point, the database may further be deleted or removed from the object-based data storage service.

At a future time, if the customer required access to that database, the customer could perform a backup operation by transmitting a backup command 308 to the database service instance 315, such that the customer could cause a restore of the backup SQL server database or database served by the backup server to the customer's local machine. For example, the customer may cause a restore operation to be performed from the database service instance 315 to the customer local machine 305 in order to restore the SQL server database backup files previously stored in an object-based data storage service, currently stored in the database service instance 315, by performing an opposite operation from the backup operation. The customer could cause the database service instance 315 to issue a "PUT" object request 307 in order to put the SQL server database backup into the object-based data storage service 310 and issue a "GET" object request 309 to the object-based data storage service that would cause the SQL server database backup to be downloaded to the customer machine 305. The customer machine 305 would then perform a restore operation as described and depicted in connection with FIGS. 2 and/or 6.

Figure 4:
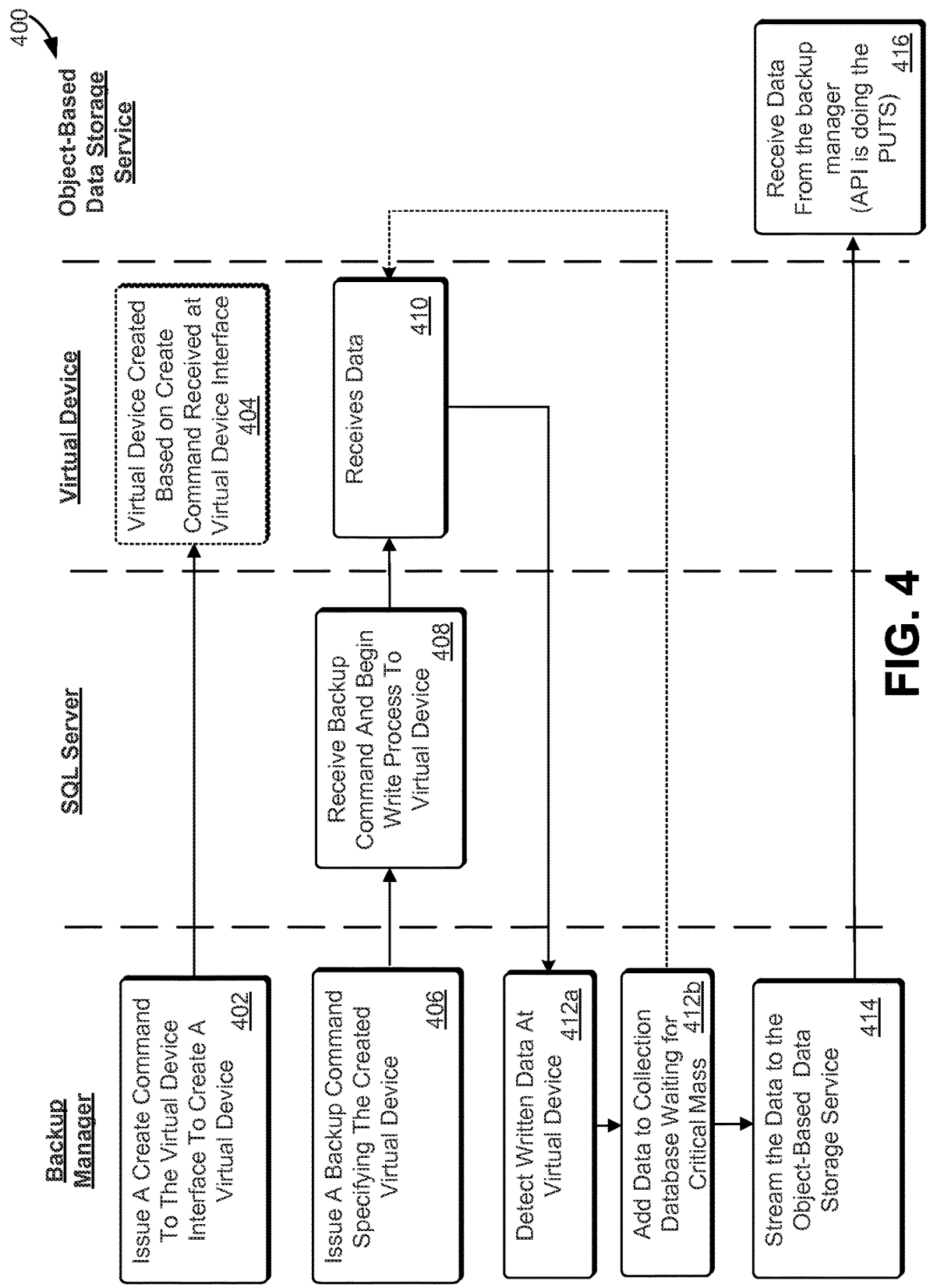
FIG. 4 is an illustrative example of a swim diagram illustrating a process for transferring data from a database server to an object-based data storage service in accordance with at least one embodiment.

In further example embodiments, as a customer may only require redundant storage of the SQL server database for compliance purposes, the customer may decide to cause the data to be written to an archival data storage service, instead of an object-based data storage service. The computing resource service provider may include or be operably interconnected to an archival storage service. The archival storage service may be configured to persistently store data that may be infrequently accessed and for which long retrieval times are acceptable to a customer utilizing the archival storage service FIG. 4 is a swim diagram illustrating a process 400 for provisioning a virtual desktop in a virtual desktop service in accordance with some embodiments. The process 400 may be performed, for example, by various components of the virtual computing environment described and illustrated in connection with FIGS. 1-3. For example, the process 400 may be performed by a media server, such as the b, a Structured Query Language (SQL) server, such as the SQL server 105, a virtual device, such as the virtual device 110, and an object-based data storage service, such as the storage service 125 all depicted and described in connection with FIG. 1 or a suitable component thereof.

Returning to FIG. 4, the process 400 includes at a step 402, a backup manager issuing, to a virtual device interface, such as the VDI 215 as described and depicted in connection with FIG. 2, a command to instantiate a virtual device. The command may include local credentials providing authorization and/or authentication of the user's credentials to access the local SQL server to be interfaced with the virtual device.

Returning to FIG. 4, in step 404, a new virtual device is instantiated in response to the command received by the VDI. At step 406, the backup manager transmits, to the SQL server, a backup command that specifies the newly created virtual device. The backup command may instruct the SQL server to begin performing a backup of the SQL server database to the virtual device, in order to transfer a copy of the SQL server database to an object-based data storage service. The backup manager may similarly issue a restore command, in place of the backup command, which would restore the data contents of a previously performed backup operation.

At step 408, the SQL server receives the backup command from the backup manager and begins a write process to the virtual device. At step 410, the virtual device is configured to receive the data from the SQL server database. At step 412a, the backup manager is configured to receive information regarding data written or detect data written to the virtual device and at step 412b, the data may be added to a buffer of the backup manager in order to collect the data while waiting for a critical mass of data prior to transmitting the data to the object-based data storage service. In example embodiments where the data has not reached a critical mass, e.g., a data minimum required to upload to the object-based data storage service, the backup manager may loop to receive additional data 410 from the virtual device until enough data is accumulated and/or the end of the database has been reached. At step 414, the backup manager is configured to transmit, e.g., stream, the backup data to the object-based data storage service, which, at step 416, is configured to receive the backup data from the backup manager or a buffer of the backup manager.

Figure 5:
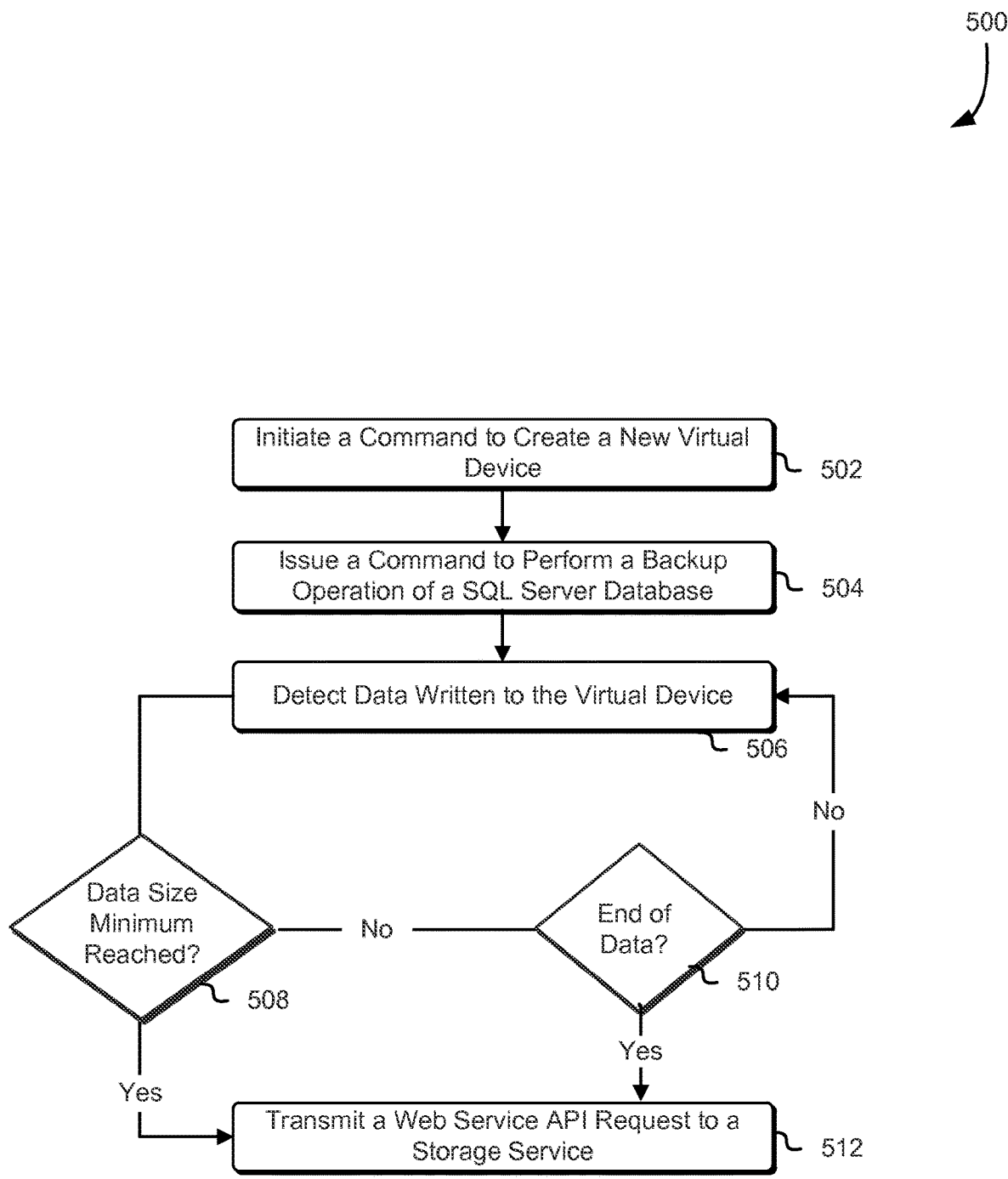
FIG. 5 is an illustrative example of a process for initiating a database server backup request in accordance with at least one embodiment.

FIG. 5 is an illustrative example of a process 500 for performing a backup or restore operation between a Structured Query Language (SQL) server and an object-based data storage service in accordance with at least one embodiment. The process 500 may be accomplished by a computing server, such as a backup manager 201 and/or software process 202 depicted and described in connection with FIG. 2 or a suitable component thereof.

Returning to FIG. 5, the process 500 may include the backup manager initiating a command to create a new virtual device (502), such as a command transmitted to a virtual device interface of the virtual device, such as the VDI 215 described and depicted in connection with FIG. 2. Returning to FIG. 5, the backup manager may further issue a command to the SQL server to perform a backup operation of an SQL server database (504), where an SQL server could be a Microsoft® SQL Server.

The backup manager, via an appropriately configured application programming interface (API) that may be incorporated in the backup manager or operably interconnected thereto, may detect data written to the virtual device (506) and may determine if a data size minimum has been reached. For example, for a multipart upload, the object-based data storage service may require a minimum size of an object to be uploaded, where each part to be transferred must be at least 3 MB, 5 MB, or varying sizes of data before the data may be transmitted. If the data size minimum has not been reached, but not additional data is being detected, the backup manager may determine if the database backup is complete (510), such that there is no more data to be written to the virtual device. If the data is end of data, the data is transmitted to the storage service, otherwise, the backup manager continues to detect data being written to the virtual device (506). The backup manager, once the data size minimum has been reached, is configured to transmit a web service API request to a storage service (512), such as the object-based data storage service 225 as described and depicted in connection with FIG. 2.

In various embodiments, authenticity and/or authentication may be required in order to access the SQL server and perform operations thereon. For example, authenticity may require that a command transmitted from the backup server provide necessary, specified, or requested valid credentials (e.g., an electronic signature) to access and operate the SQL server. The credentials may determine read/write access as well as administrator privileges. The credentials may further grant permissions to a user of the object-based data storage service to read/write to the data storage service in order to backup and/or restore an SQL server database. While SQL server is used throughout example embodiments, the server may be a database management system or the like.

Example embodiments of the backup manager may include a backup log configured to record events that occur during a migration process, such as backup/restore processes. A record of the backup/restore processes can be a useful troubleshooting tool in case there is a problem with the backup. If a problem occurs during the backup process, the log may record the error messages created by the backup application when the error occurred. The backup logs can be set to store summary data, such as notification that a file failed to open, details about the files that were backed up, etc.

While many of the disclosed embodiments are described in the context of a system where the backup code is situated on the same computing resources as the SQL server, at least some embodiments can also be used in situations where the backup code is stored on a centralized server in order to perform centralized scheduling systems for all backup and/or restore functions for multiple computing devices around a network.

Figure 6:
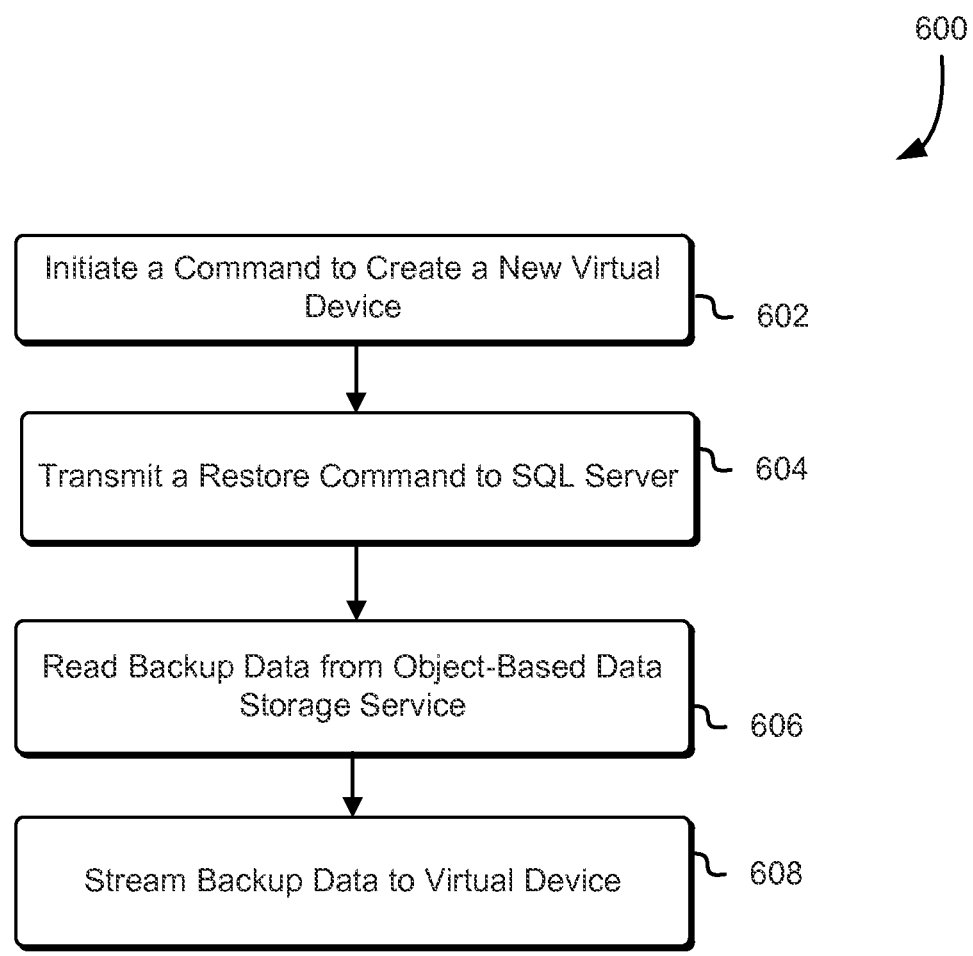
FIG. 6 is an illustrative example of a process for initiating a database server restore request in accordance with at least one embodiment.

FIG. 6 is an illustrative example of a process 600 for performing a restore operation between an object-based data storage service and a Structured Query Language (SQL) server in accordance with at least one embodiment. The process 600 may be accomplished by a computing server, such as a backup manager 201 and/or restore software application 204 depicted and described in connection with FIG. 2 or a suitable component thereof.

Returning to FIG. 6, the process 600 may include the backup manager initiating a command to create a new virtual device (602). The backup manager may further transmit a web service application programming interface (API) request to an object-based data storage service, wherein the request causes the storage service to perform or initiate a data restore operation (604). The restore operation may include restoring data or database backup data stored in the on-demand data storage service from a previously executed backup operation. The backup manager may read backup data from the object-based data storage service (606) and stream the backup data to the virtual device (608).

Figure 7:
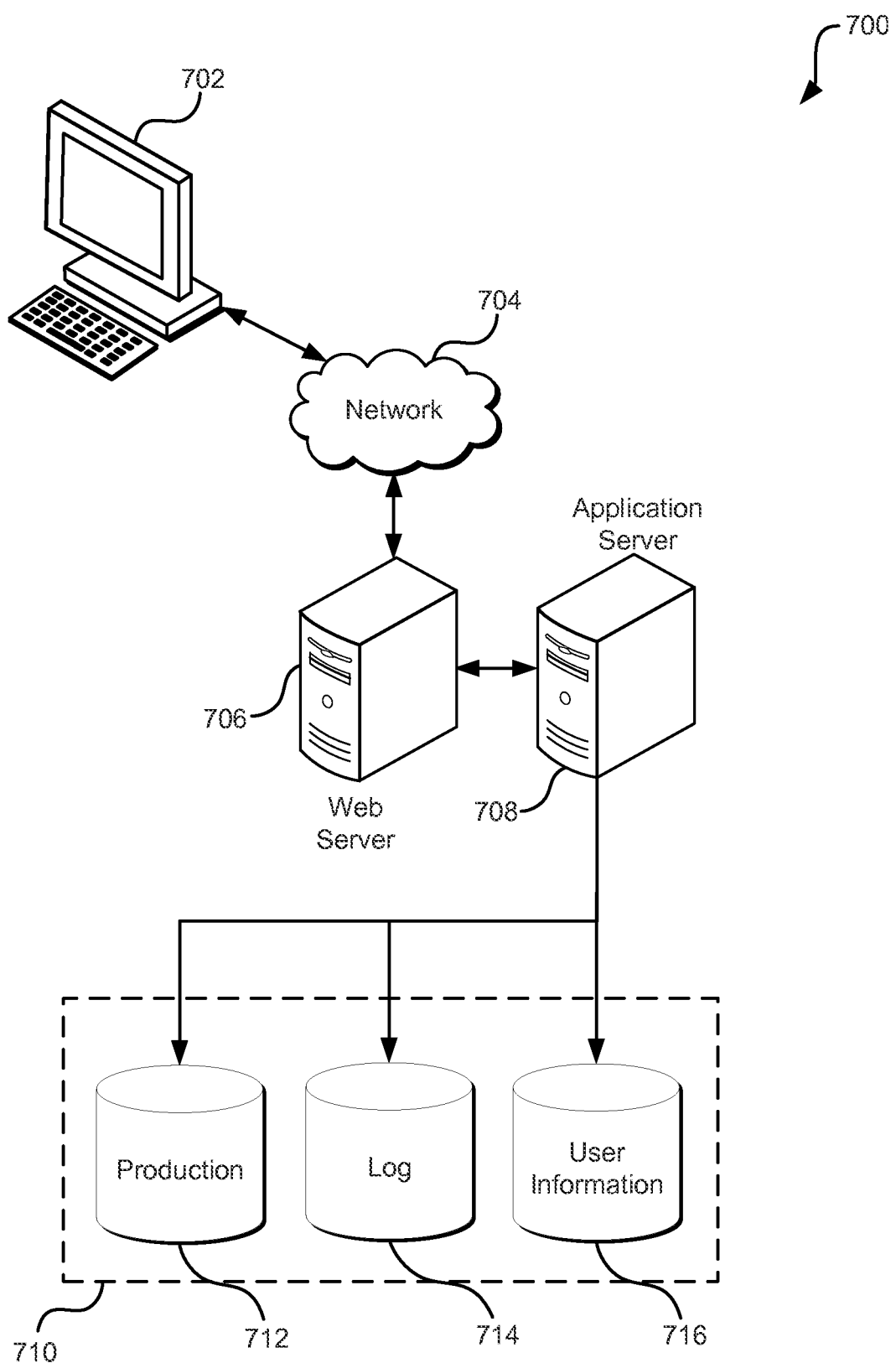
FIG. 7 is an illustrative example of an environment in accordance with at least one embodiment.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information may be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   transmitting a first request, at a backup manager of one or more computing devices to a virtual device application programming interface, to create a virtual device to which a structured query language (SQL) server can write;
   transmitting, to the SQL server, a second request to write a backup of a database managed by the SQL server to the virtual device;
   buffering a portion of the backup written to the virtual device for the backup in a volatile memory corresponding to the virtual device, wherein the portion of the backup is compressed prior to the portion of the backup being written to the virtual device;
   as a result of a determination that a size of the portion of the backup buffered in volatile memory has not met a threshold size, looping by the backup manager such that additional data is added to the portion of the backup;
   transmitting at the backup manager, as a result of the size of the portion of the backup buffered in the volatile memory reaching the threshold size, a web service application programming interface request to an object-based data storage service to transfer the portion of the backup from the volatile memory to the object-based data storage service to be stored in a data object in the object-based data storage service; and receiving a status update related to the portion of the backup written to the virtual device.

2. The computer-implemented method of claim 1, wherein the method further comprises generating the web service application programming interface request to include the portion of the backup.

3. The computer-implemented method of claim 1, wherein the portion of the backup is compressed in response to a backup command.

4. The computer-implemented method of claim 1, wherein the virtual device application programming interface enables structured query language server backup operations and/or restore operations without storing the database managed by the SQL server to a disk prior to the web service application programming interface request being transmitted to the object-based data storage service.

5. A system, comprising:
one or more processors; and memory storing instructions that, when executed by the one or more processors, cause the system to at least:
transmit a first request, at least in part by a backup manager, to a virtual device application programming interface to create a virtual device to which a structured query language (SQL) server can write;
transmit a second request, to a database management system of the SQL server, to write a backup of a database managed by the database management system to the virtual device;
buffer a portion of the backup written to the virtual device for the backup of the database in a volatile memory corresponding to the virtual device, wherein the portion of the backup is compressed prior to the portion of the backup being written to the virtual device;
as a result of a determination that a size of the portion of the backup buffered in the volatile memory has not met a threshold size, loop by the backup manager such that additional data is added to the portion of the backup;
cause, as a result of the size of the portion of the backup buffered in the volatile memory reaching the threshold size, a web service application programming interface request to be transmitted to an object-based data storage service to transfer the portion of the backup from the volatile memory to the object-based data storage service to be stored in a data object in the object-based data storage service; and
receive a status update related to the portion of the backup written to the virtual device.

6. The system of claim 5, wherein the database management system is a database server.

7. The system of claim 5, wherein the instructions further cause the system to store the portion of the backup in a buffer of the virtual device, wherein the buffer includes the volatile memory.

8. The system of claim 5, wherein, in a backup operation, the virtual device is a source and the object-based data storage service is a target, and, wherein, in a restore operation, the object-based data storage service is the source and the virtual device is the target.

9. The system of claim 5, wherein the object-based data storage service includes an on-demand data storage service or an archival data storage service.

10. The system of claim 5, wherein the instructions further cause the system to:
receive messages from the virtual device, wherein the messages include the status update related to the portion of the backup written to the virtual device; and
create a transaction log to store the received messages.

11. The system of claim 5, wherein the instructions further cause the system to:
retrieve, at a data buffer, the portion of the backup written to the virtual device; and
forward the portion of the backup, from the data buffer, to the object-based data storage service, in response to the web service application programming interface request being transmitted.

12. The system of claim 5, wherein the virtual device enables database management system restore operations from the object-based data storage service to the database management system via the virtual device.

13. A non-transitory computer-readable storage medium having stored thereon instructions that, when executed by one or more processors of a computer system, cause the computer system to at least:
transmit a first request, at a backup manager of one or more computing devices of the computer system, to a virtual device application programming interface to create a virtual device to which a structured query language (SQL) server can write;
transmit a second request, to a database management system of the SQL server, to write a backup of a database managed by the database management system to the virtual device;
buffer a portion of the backup written to the virtual device for the backup of the database in a volatile memory corresponding to the virtual device, wherein the portion of the backup is compressed prior to the portion of the backup being written to the virtual device;
as a result of a determination that a size of the portion of the backup buffered in the volatile memory has not been reached, loop by the backup manager such that additional data is added to the portion of the backup;
transmit at the backup manager, as a result of a determination that the size of the portion of the backup buffered in the volatile memory has reached a threshold size, a web service application programming interface request as a third request to an object-based data storage service to transfer the portion of the backup from the volatile memory to the object-based data storage service to be stored in a data object in the object-based data storage service;
and receive a status update related to the portion of the backup written to the virtual device.

14. The non-transitory computer-readable storage medium of claim 13, wherein the database management system is a database server.

15. The non-transitory computer-readable storage medium of claim 13, wherein the instructions further cause the computer system to store the portion of the backup in a buffer of the virtual device, wherein the buffer includes the volatile memory.

16. The non-transitory computer-readable storage medium of claim 13, wherein, in a backup operation, the virtual device is a source and the object-based data storage service is a target, and, wherein, in a restore operation, the object-based data storage service is the source and the virtual device is the target.

17. The non-transitory computer-readable storage medium of claim 13, wherein the object-based data storage service includes an on-demand data storage service or an archival data storage service.

18. The non-transitory computer-readable storage medium of claim 13, further comprising instructions that, if executed by the one or more processors, cause the computer system to:
  receive messages from the virtual device, wherein the messages include the status update related to the portion of the backup written to the virtual device; and
  update a transaction log based at least in part on the received messages.

19. The non-transitory computer-readable storage medium of claim 13, wherein further comprising instructions that, if executed by the one or more processors, cause the computer system to:
  retrieve, at a data buffer, the portion of the backup written to the virtual device; and
  forward the portion of the backup, from the data buffer, to the object-based data storage service, in response to the third request.

20. The non-transitory computer-readable storage medium of claim 13, wherein the virtual device enables database management system restore operations from the object-based data storage service to the database management system via the virtual device.

* * * * *